Sept. 29, 1953  D. L. KINDER  2,653,482
WIND MACHINE OSCILLATOR

Filed Jan. 24, 1951  2 Sheets-Sheet 1

DON L. KINDER,
INVENTOR.

BY Stuart M. Maule
ATTORNEY

Sept. 29, 1953     D. L. KINDER     2,653,482
WIND MACHINE OSCILLATOR
Filed Jan. 24, 1951     2 Sheets-Sheet 2
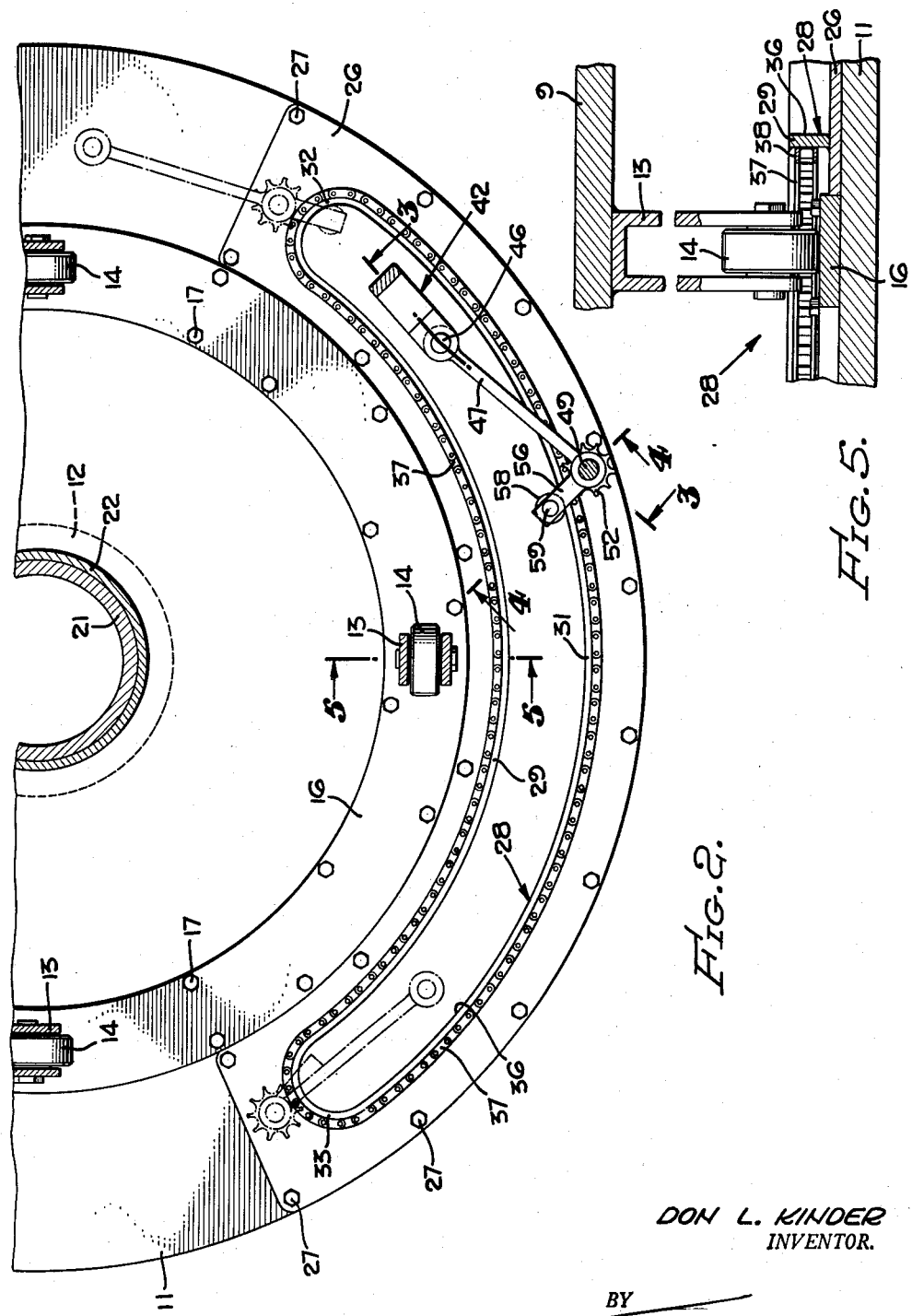
DON L. KINDER
INVENTOR.
BY
ATTORNEY Patented Sept. 29, 1953

2,653,482

UNITED STATES PATENT OFFICE 2,653,482

WIND MACHINE OSCILLATOR

Don L. Kinder, Redlands, Calif.

Application January 24, 1951, Serial No. 207,460

4 Claims. (Cl. 74—29)

This invention relates to plant husbandry, and more particularly to apparatus for protecting plants and fruit from the damaging effects of frost.

Frost-preventing equipment known as an "orchard blower" conventionally comprises a fan or propeller and driving motor therefor mounted upon a suitable table which is revolubly supported upon a stationary platform mounted in an elevated position from which the blast from the propeller can be directed above the trees or other plants which they are intended to protect. In ordinary practice, such a blowing machine is mounted at the center of the area for which it is intended to offer protection, and the table is caused to rotate slowly but continuously in one direction, so that the propeller's blast is directed at regular intervals over each portion of the area at the center of which the machine is located.

My observations of the operation of such machines, however, have shown that even during those periods of dangerously low temperature when there is no perceptible breeze, the area throughout which a blowing machine is effective in preventing frost damage to growing crops frequently is offset with respect to the location of the blower, to the extent that efficient protection is attained to a much greater radial distance from the blower on one side thereof than on the opposite side. Moreover, these results seem to be consistent for substantially all of the machines of a given locality, thus indicating that, although there might not be any perceptible wind or breeze, there is a natural drift of the air, the direction of which is probably determined by the contours of the land surface in the immediate and/or the neighboring localities.

It is an object of the present invention to provide improvement in the design and arrangement of orchard blowers which will permit taking full advantage of such natural air drift in any localities in which they regularly occur, by causing the machine to oscillate back and forth through only a predetermined angular distance on each side of the direction of the drift, thereby taking full advantage of the natural movement of large masses of air.

Indeed, by regulating all of a plurality of orchard blowers in a given locality so that they co-operate with each other by all blowing in the same general direction, the natural air drift can be built up to a very substantial degree, and thus rendered sufficiently effective in attaining that degree of air turbulence which is requisite in protecting plants and crops from frost in sub-freezing weather to make it possible to protect an area with substantially fewer blowing machines than when used in accordance with more conventional practice wherein each machine rotates continuously in the same direction about its vertical axis.

A more detailed object in this connection is to provide mechanism for causing the turn-table of an orchard blower and the motor and fan carried thereby, to oscillate in rotary motion through an arc of a predetermined number of degrees, rather than to rotate continuously in the same direction of rotation.

A further object is to design the oscillating mechanism so that it operates smoothly and positively, and so that it is amply strong to maintain continuity and regularity of its operation, even when struck by sudden and relatively violent winds, and to protect the apparatus against damage by such winds whether they occur during periods of activity or inactivity of the machine.

Further objects of the invention are concerned with the details of construction of the oscillating mechanism, the result of which is to attain the hereinabove mentioned general objects, without, however, materially adding to the cost of the entire machine.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 2 is a horizontal sectional view, drawn to an enlarged scale, taken upon the line 2—2 of Figure 1, with the direction of view as indicated.

Figure 5 is a vertical sectional view taken upon the line 5—5 of Figure 2, with the direction of view as indicated.

Figure 1:
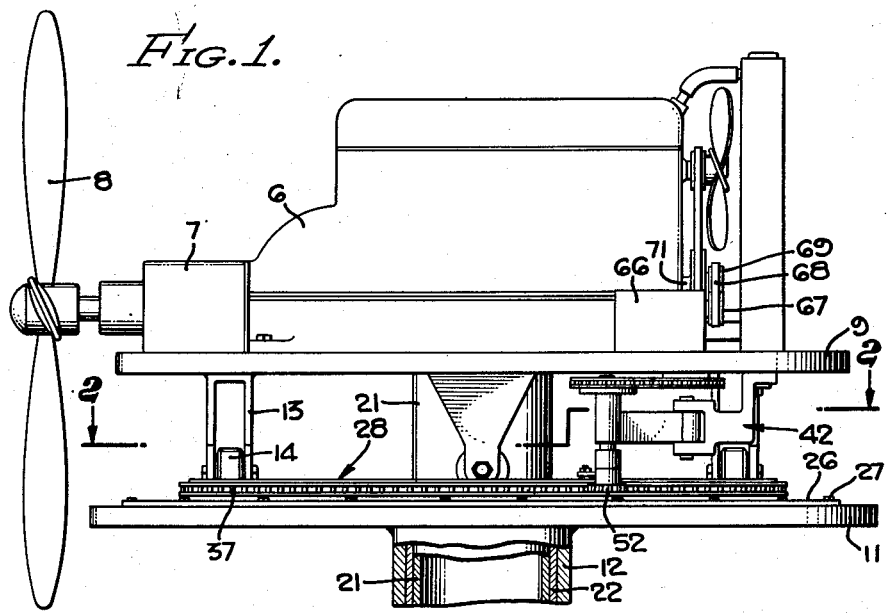
Figure 1 is a view in side elevation of a wind machine or orchard blower having an oscillating mechanism incorporating the principles of the present invention in operative association therewith.
Figure 3:
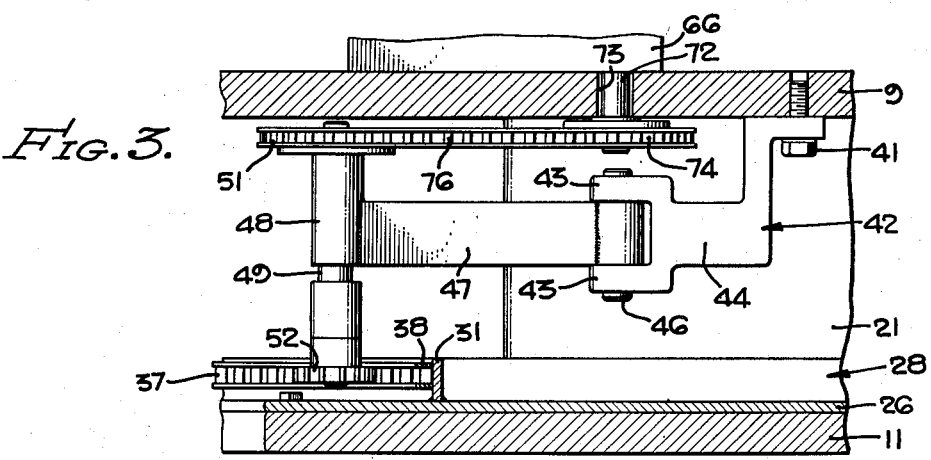
Figure 3 is a compound, enlarged detail view in vertical section, the planes of which are indicated by the lines 3—3 of Figure 2, and the direction of view by the arrows.

In the figures, the motor 6, speed reduction gear box 7, and propeller 8 are illustrated as being of conventional design and so associated with each other that the propeller or fan 8 is powered by the motor 6 to be driven thereby at suitable speed as determined by the gear ratios of the reduction gear 7. These elements are mounted upon a turn-table 9 which is mounted for rotary movement about a vertical axis upon a stationary platform 11 which may be supported in accordance with conventional practice on the upper end of a supporting tower 12, disposing the entire installation at suitable elevation so that the blast or air stream from the propeller 8 can be directed out over the trees of an orchard (not shown) or other plants for which or for the fruits of which the installation is intended to provide frost protection.

Any suitable means may be provided for supporting the turn-table 9 upon the stationary platform 11 for free rotation with respect thereto and about a vertical axis, which axis preferably coincides with that of the tower 12. As illustrated, the weight of the turn-table 9 and the parts supported thereby is disposed upon the platform 11 through the expedient of a plurality of brackets 13 rigid with and extending downwardly from the under surface of the turn-table 9 and carrying rollers 14 journaled in their lower ends and resting upon an annular, smooth surface plate 16 which is secured as by a plurality of bolts 17 to the upper surface of the stationary platform 11 in concentric relationship to the tower 12. A cylindrical sleeve 21 rigid with the turn-table 9 and extending downwards from the lower surface thereof concentrically with respect to a circle inscribed through the several brackets 13, is disposed in telescopic relationship with the upper end of the tower 12 so as to rotate freely with respect thereto. Preferably a suitable bushing 22 is interposed between the sleeve 21 and the inner circumference of the tower 12.

Thus it may be seen that the turn-table 9 and the parts carried thereby, are supported upon the platform 11 for free rotary motion with respect thereto about a vertical axis, which axis coincides with the axis of the supporting tower 12.

The present invention contemplates the provision of a mechanism for causing the turn-table 9 to rotate about this vertical axis, not in continuous rotation in one direction as heretofore, but in oscillatory rotary movement back and forth through an angular movement of predetermined extent as required by the particular circumstances of any certain installation.

A plate 26 is rigidly mounted upon the upper surface of the platform 11 as by a plurality of bolts 27. These bolts 27, however, are removable so that the plate 26 can be dismounted from the platform 11 and another substituted therefor in the event that variation in the range of oscillatory movement of the wind machine should become necessary. Secured to the upper surface of the plate 26 is an endless track 28 comprising inner and outer arcuate portions 29 and 31 respectively, lying in a common substantially horizontal plane, disposed one inside the other concentrically with respect to each other as well as with respect to the vertical axis about which the turn-table 9 moves with respect to the platform 11. At their ends, the inner and outer arcuate portions 29 and 31 are interconnected by end portions 32 and 33, each of which also is of arcuate form so that it merges gradually at its ends into the ends of the inner and outer arcuate portions 29 and 31. Actually, the relatively small arc described by each of the end portions 32 and 33 is tangential with the much larger arcs of the inner and outer portions 29 and 31 of the track, as is clearly shown in Figure 2.

The track 28 comprises essentially two parts, to wit, a relatively smooth inner portion 36 and a rack 37 defining the outer surface of the track 28. The smooth inner portion 36 is conveniently formed of a suitable length of strap iron or flat strip stock bent to the desired form to present the described inner and outer arcuate portions 29 and 31 and the interconnecting end portions 32 and 33. The outer surface or rack 37 is conveniently provided in the form of a conventional roller chain of the type commonly employed for the transmission of power from one sprocket gear to another. It is attached rigidly and permanently to one of the flat sides of the smooth portion 36 of the track as by welding each link 38 of the chain thereto.

Figure 4:
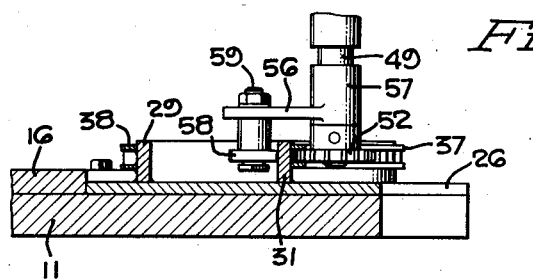
Figure 4 is a vertical sectional view taken upon the line 4—4 of Figure 2, with the direction of view as indicated.

Rigidly secured, as by a plurality of bolts 41, to the under surface of the turn-table 9 is a bracket 42 bifurcated, as indicated at 43, at an end 44 thereof which is spaced downwardly from the under surface of the turn-table 9. A pin 46 extending across the bifurcation 43 of the bracket 42 pivotally supports an arm 47 upon the outer end of which a bearing 48 is mounted. A vertical shaft 49 is journaled in the bearing 48; and to the upper end of the shaft 49 a driven sprocket gear 51 is rigidly secured. Another sprocket gear 52 is rigidly secured to the lower end of the shaft 49 so that when the driven gear 51 rotates the sprocket gear 52 rotates therewith at like speed. The lower sprocket gear 52 is in planar alignment with the track 28; hence, it can be brought into enmeshing relation with the rack 37 owing to the pivoted interconnection between the arm 47 and its supporting bracket 44. Means are provided for retaining the sprocket gear 52 in such enmeshing relation with the rack 37. The shaft 49 also supports a bracket 56 (best shown in Figures 2 and 4) at one end of which is provided a bearing 57 through which the shaft 49 extends so as to mount the bracket 56 upon the shaft 49 for free rotary motion with respect thereto. Adjacent the outer end of the bracket 56 a roller 58 is revolubly mounted as by means of a pin 59 extending rigidly downward from the bracket 56 and having the roller 58 freely revoluble thereon in planar alignment with the track 28. When in operative association, the bracket 56 extends across one of the runs of the track 28 so that while the sprocket gear 52 is enmeshed with the rack 37 at the outer surface of the track, the roller 58 engages the inner surface of the smooth portion 36, thereby preventing the sprocket gear 52 from moving outwardly away from the track 28 such a distance that the teeth of the gear 52 might become disengaged from the rack 37.

Inasmuch as the track 28 is immobilized with respect to the stationary platform 11, the described engagement of the sprocket gear 52 with the rack 37 will, when the shaft 49 is turned, cause the gear 52 to advance along the track 28, thereby developing a thrust upon the arm 47 which will, because of its connection through the bracket 42 to the turn-table 9, impart rotary motion to the turn-table and thereby change the direction in which the blast of air is given by the propeller 8. Whether the thrust upon the arm 47 is compressive or tensile is immaterial as far as the purpose of the present invention is concerned and depends merely upon the direction of rotation of the shaft 49 and the sprocket gear 52 carried thereby. Regardless of the direction in which it advances along the track 28, when the sprocket gear 52 reaches an end of the arcuate portion 29 or 31, as the case might be, it will be retained in enmeshing relation with the rack 37 because of the hereinabove described operation of the idling roller 58 in rolling engagement with the opposite smooth portion 36 of the track. Therefore, the sprocket gear 52 will progress from that arcuate portion 29 or 31 into engagement with one of the smaller interconnecting portion 32 or 33, as the case might be, and thence, after it has traversed the length of that interconnecting portion 32 or 33, into engagement with the other arcuate portion 29 or 31. The direction of rotation of the shaft 49 and sprocket gear 52 remaining the same, the direction of rotary motion of the turn-table 9 will, of course, then be reversed and will continue in this return angular motion until the sprocket gear 52 reaches the opposite end of the large arcuate portion of the track which it is then engaging, whereupon the gear 52 will traverse the other interconnecting arcuate portion 32 or 33, as the case might be, and progress therefrom onto the large arcuate portion with which it was first described as being in enmeshing relation. This cycle of operation will, of course, be repeated indefinitely so long as rotation of the shaft 49 is maintained, causing the turn-table 9 to oscillate back and forth in angular motion about its vertical axis and through an arc the extent of which is determined by the number of degrees in the arcs described by the inner and outer runs 29 and 31 of the track 28.

The means for rotating the shaft 49 preferably includes a speed reduction mechanism which is not shown but which is enclosed within a suitable housing 66 so mounted upon the table 9 that the driving pulley 67 thereof may conveniently be connected by a belt 68 to a pulley 69 upon the forward end of the crank shaft 71 of the motor 6. The driven shaft 72 of the speed reduction gear within the housing 66 extends downwards through a suitable aperture 73 in the table 9 to receive a driving sprocket gear 74 upon its lower end; and this driving gear 74 is operably connected to the driven gear 51 on the shaft 49 as by a driving chain 76. The shaft 72 which carries the driving gear 74 is immediately above and in coaxial alignment with the pin 46 upon which the arm 47 is pivotally mounted, with the result that movement of the arm 47 about the axis of the pin 46 can occur without having any effect upon the tightness of the chain 76.

I claim:

1. In apparatus of the character described, a stationary platform, a table mounted thereon for rotary motion with respect thereto about a vertical axis, and means for turning said table about said vertical axis, said turning means comprising a pair of arcuate racks disposed one inside the other and in a horizontal plane about a common center lying within said vertical axis, the respective operating faces of said racks being directed oppositely, an arm, means pivotally mounting said arm on said table for movement about a vertical axis, journal means carried by said arm, a vertical shaft revoluble in said journal means, a gear rigid with said shaft and disposed in planar alignment with said arcuate racks, and guiding means operatively associated with said arm for maintaining said gear selectively enmeshed with one or the other of said racks, and means for turning said shaft comprising a driven gear rigid with said shaft, a driving gear journaled on said table for rotation about an axis coinciding with the axis of said arm's mounting means, a driving chain interconnecting said driving and driven gear and means for rotating said driving gear.

2. In apparatus of the character described, a stationary platform, a table mounted thereon for rotary motion with respect thereto about a vertical axis, and means for turning said table about said vertical axis, said turning means comprising an endless track arranged to define inner and outer concentric arcuate portions mounted rigidly with respect to said platform with their common center in said vertical axis and end portions interconnecting and merging gradually into the corresponding ends of said arcuate portions, one side of said track being a continuous, substantially smooth surface and the opposite side having means thereon defining a continuous rack, an arm pivotally mounted on said table for movement about a vertical axis at a radial distance from said axis of said table greater than the radius of said inner arcuate portion of said track and less than the radius of said outer arcuate portion, a vertical shaft journaled at the outer end of said arm, a gear rigid with said shaft in planar alignment with said rack, a bracket mounted at one end thereof for free rotary movement on said shaft, an idler roller revolubly mounted on the other end of said bracket and in rolling engagement with said smooth surface of said track whereby said gear is retained in enmeshed engagement with said rack, and means for turning said shaft.

3. In apparatus of the character described, a stationary platform, a table mounted thereon for rotary motion with respect thereto about a vertical axis, and means for turning said table about said vertical axis, said turning means comprising an endless track arranged to define inner and outer concentric arcuate portions mounted rigidly with respect to said platform with their common center in said vertical axis and end portions interconnecting and merging gradually into the corresponding ends of said arcuate portions, one side of said track being a continuous, substantially smooth surface and the opposite side having means thereon defining a continuous rack, an arm, means pivotally mounting said arm on said table for movement about a vertical axis at a radial distance from said axis of said table greater than the radius of said inner arcuate portion of said track and less than the radius of said outer arcuate portion, a vertical shaft journaled at the outer end of said arm, a gear rigid with said shaft in planar alignment with said rack, a bracket mounted at one end thereof for free rotary movement on said shaft, an idler roller revolubly mounted on the other end of said bracket and in rolling engagement with said smooth surface of said track whereby said gear is retained in enmeshed engagement with said rack, a driven gear rigid with said shaft, a driving gear journaled on said table for rotation about an axis coinciding with that of said arm's mounting means, a chain operably connecting said driven gear to said driving gear to be rotated thereby, and means for rotating said driving gear.

4. In apparatus of the character described, a stationary platform, a table mounted thereon for rotary motion with respect thereto about a vertical axis, and means for turning said table about said vertical axis, said turning means comprising an endless track arranged to define inner and outer concentric arcuate portions mounted rigidly with respect to said platform with their common center in said vertical axis and end portions interconnecting and merging gradually into the corresponding ends of said arcuate portions, said track comprising a substantially smooth strip defining one side of said track and a chain secured to said strip and defining the other side of said track, an arm pivotally mounted on said table for movement about a vertical axis at a radial distance from said axis of said table greater than the radius of said inner arcuate portion of said track and less than the radius of said outer arcuate portion, a vertical shaft journaled at the outer end of said arm, a sprocket gear rigid with said shaft in planar alignment with said chain, a bracket mounted at one end thereof for free rotary movement on said shaft, an idler roller revolubly mounted on the other end of said bracket and in rolling engagement with said smooth strip whereby said sprocket gear is retained in enmeshed engagement with said chain, and means for turning said shaft.

DON L. KINDER.

References Cited in the file of this patent

UNITED STATES PATENTS

| Number | Name | Date |
|---|---|---|
| 610,852 | Rolle | Sept. 13, 1898 |
| 1,138,390 | Morelli | May 4, 1915 |
| 2,481,702 | Towt | Sept. 13, 1949 |
| 2,510,082 | Davey | June 6, 1950 |